United States Patent [19]

Yamakage et al.

[11] Patent Number: 5,022,494
[45] Date of Patent: Jun. 11, 1991

[54] HEAT EXCHANGER FOR OIL

[75] Inventors: Hisaaki Yamakage; Kenhachiro Nomura; Tadayoshi Maruyama; Kenji Kataoka; Nobuyuki Yamashita, all of Kobe, Japan

[73] Assignee: Mitsubishi Denki Kabushiki Kaisha, Japan

[21] Appl. No.: 443,847

[22] Filed: Dec. 4, 1989

Related U.S. Application Data

[63] Continuation of Ser. No. 43,806, Apr. 29, 1987, abandoned.

[30] Foreign Application Priority Data

May 7, 1986 [JP] Japan ................................ 61-106058
Jun. 23, 1986 [JP] Japan ................................ 61-96387[U]
Jun. 23, 1986 [JP] Japan ................................ 61-147407

[51] Int. Cl.$^5$ ........................ F01M 5/00; F28D 15/02
[52] U.S. Cl. .................................... 184/104.1; 165/47; 165/104.14; 165/132; 165/916
[58] Field of Search ................ 165/104.14, 47, 132, 165/916; 126/41.33; 184/104.1-104.3

[56] References Cited

U.S. PATENT DOCUMENTS 1,750,750  3/1930  Gay ........................... 165/104.14
2,522,948  9/1950  Hoffmann ........................ 165/132
4,270,064  5/1981  Glandorf et al. ................ 184/104.1

FOREIGN PATENT DOCUMENTS 9048      1/1979   Japan .................... 165/916
168890   10/1983   Japan .................... 165/132
175696   10/1984   Japan .................... 184/104.1
2142131   1/1985   United Kingdom ...... 165/104.14

OTHER PUBLICATIONS

"Machine Technology", Sandvik Coromant, vol. 29, No. 6, 1981.

Primary Examiner—Albert W. Davis, Jr.
Attorney, Agent, or Firm—Leydig, Voit & Mayer

[57] ABSTRACT

A heat exchanger for oil from a machine, and particularly from the main spindle system of a machine tool comprises a heat pipe having a heat absorbing portion which is immersed in an oil tank and a heat dissipating portion which is disposed outside the oil tank. An oil guide surrounds the heat absorbing portion and guides hot oil from the machine tool past the heat absorbing portion. A working fluid sealed inside the heat pipe cools the hot oil by evaporation and dissipates the heat to the surrounding air. An oil weir may be disposed at one end of the oil guide so as to maintain an adequate level of oil in the oil guide when the oil level in the oil tank is below the bottom of the heat pipe.

16 Claims, 4 Drawing Sheets

HEAT EXCHANGER FOR OIL

This application is a continuation of application Ser. No. 07/043,806, filed Apr. 29, 1987, now abandoned.

BACKGROUND OF THE INVENTION

This invention relates to a heat exchanger for oil used in machinery. More particularly but not exclusively, it relates to a heat exchanger for the oil in the main spindle system of a machine tool.

Conventionally, a heat exchanger for cooling the oil for the main spindle system of a machine tool employs a refrigerator which is turned on and off in response to the temperature of the oil. FIG. 1 is a schematic diagram of one such conventional heat exchanger which is disclosed in "Machine Technology" (Vol. 29, No. 6 (1981), page 101, published by The Daily Industrial News Co., in Japanese). This conventional heat exchanger has an oil tank 2 into which hot oil 1 from the main spindle system of an unillustrated machine tool is discharged. The hot oil 1 is drawn out of the oil tank 2 by a pump 3, and is transported through piping 4 into the bottom of a cooling tank 5. The cooling tank 5 comprises an outer tank 5a and an inner tank 5b which has a cooling pipe 6 wound around it. The opposite ends of the cooling pipe 6 are connected to a refrigerator 7 by piping 8 and 9, respectively. Hot oil 1 which is introduced into the bottom of the outer tank 5a flows upwards through the space between the outer tank 5a and the inner tank 5b, and then overflows into the inner tank 5b. Inside the inner tank 5b, it is cooled by a refrigerant which flows from the refrigerator 7 into the cooling pipe 6 via piping 9 at a low temperature and then returns to the refrigerator 7 via piping 8 at a higher temperature, as shown by the arrows in the figure. Cooled oil 11 which was cooled by the cooling pipe 6 is then drawn from near the bottom of the inner tank 5b through oil supply piping 10 and is returned to the main spindle system of the unillustrated machine tool. A thermostat 12 is disposed in the supply piping 10 where it can detect the temperature of the cooled oil 11. An output signal from the thermostat 12 is input to an unillustrated controller, which controls the operation of the refrigerator 7.

When the temperature of the cooled oil 11 passing through the supply piping 10 is above a certain temperature, the thermostat 12 turns the refrigerator 7 on, and the refrigerator 7 delivers refrigerant to the cooling pipe 6 at a constant rate. When the temperature of the oil 11 falls below a certain temperature, the thermostat 12 turns the refrigerator 7 off to prevent overcooling of the oil 11, and the refrigerator 7 remains off until the oil temperature again rises above a certain level.

Therefore, unless the rate at which the refrigerator 7 performs cooling exactly matches the rate at which the unillustrated machine tool generates heat, the temperature of the cooled oil 11 will fluctuate periodically as the refrigerator 7 is turned on and off. Since the refrigerator 7 has a fixed cooling capacity which is chosen to handle the maximum rate at which the machine tool heats the oil 1, temperature fluctuations will be particularly pronounced due to the repeated turning on and off of the refrigerator 7 that occurs when the machine tool is generating only a small amount of heat. The fluctuations in the oil temperature cause fluctuations in the accuracy of machining, which makes this type of heat exchanger unsuitable when high machining accuracy is required.

SUMMARY OF THE INVENTION

It is an object of the present invention to provide a heat exchanger for hot oil from a machine, and particularly for hot oil from the spindle system of a machine tool which can cool the oil to a constant temperature.

It is another object of the present invention to provide a heat exchanger having a simple structure.

It is still another object of the present invention to provide a heat exchanger which can be easily installed and applied to many types of oil tanks.

A heat exchanger in accordance with the present invention employs a heat pipe as a means for cooling hot oil from the main spindle system of a machine tool. The heat pipe has a heat absorbing portion which absorbs heat from the hot oil, and a heat dissipating portion for dissipating into the atmosphere the heat which was absorbed at the heat absorbing portion. The heat absorbing portion is brought into contact with hot oil which is discharged from a machine tool by an oil guide which guides the hot oil past the heat absorbing portion and empties the cooled oil into an oil tank, from where it is returned to the machine tool.

There is no restriction on the shape of the heat pipe or the oil guide, but their shapes should conform with one another such that all the hot oil which is introduced into the oil guide will pass in close proximity to the heat absorbing portion of the heat pipe and be cooled thereby.

In a preferred embodiment, the heat absorbing portion of the heat pipe is immersed in an oil tank, and the heat dissipating portion is disposed above the oil tank. The oil guide is a box-shaped member which surrounds the bottom portion of the heat pipe. One end of the oil guide is connected to a machine tool by piping which supplies hot oil to the oil guide, while the other end of the oil guide opens onto the inside of the oil tank. The heat dissipating portion is equipped with a cooling fan for dissipating the heat which is transported within the heat pipe from the heat absorbing portion to the heat dissipating portion. Oil which is cooled by the heat pipe is returned to the machine tool by a pump.

The end of the oil guide which opens onto the inside of the oil tank may be equipped with an oil weir which maintains a minimum level of oil in the oil guide when the level of the oil in the oil tank falls below the oil guide. The oil weir ensures that hot oil from the machine tool will be adequately cooled regardless of the oil level in the oil tank.

BRIEF DESCRIPTION OF THE DRAWINGS

In the drawings, the same reference numerals indicate the same or corresponding parts.

DESCRIPTION OF THE PREFERRED EMBODIMENTS

Figure 2:
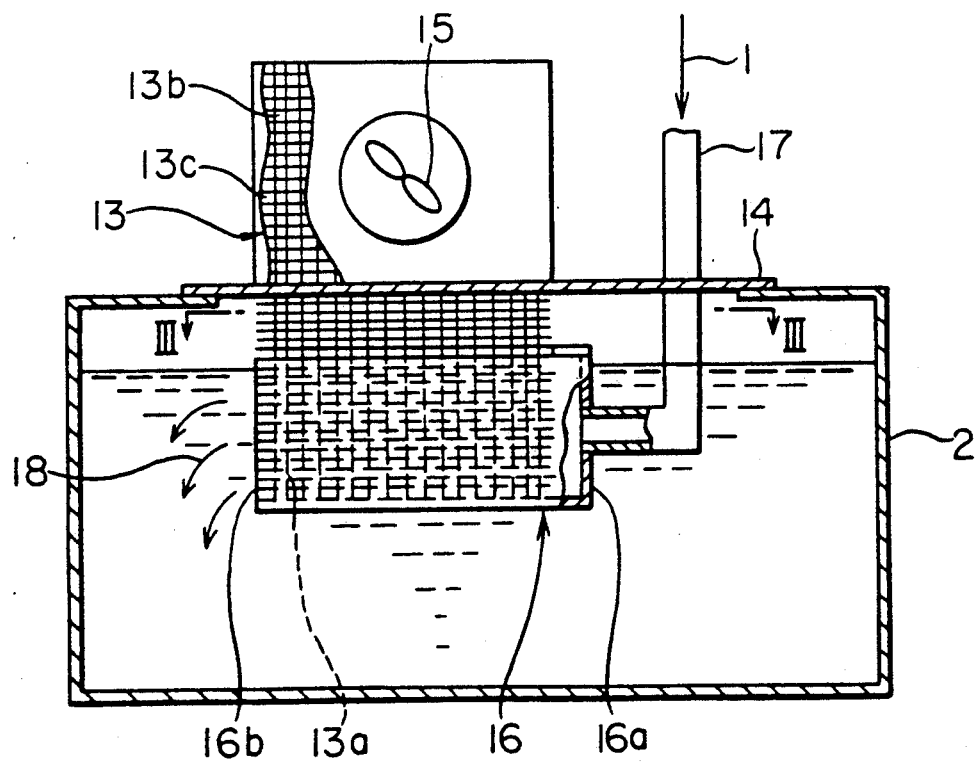
FIG. 2 is a longitudinal cross-sectional view of a first embodiment of a heat exchanger in accordance with the present invention.
Figure 3:
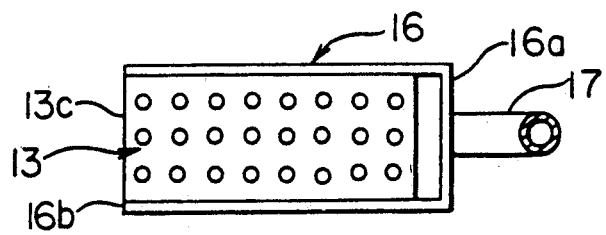
FIG. 3 is a cross-sectional view taken along Line III—III of FIG. 2.
Figure 4:
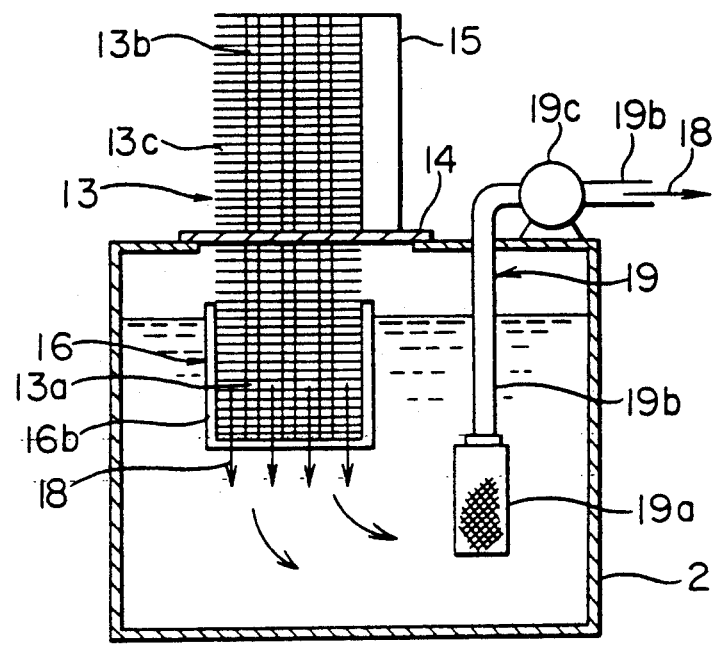
FIG. 4 is a transverse cross-sectional view of the embodiment of FIG. 2 as seen from the left side of FIG. 2.

Hereinbelow, a number of preferred embodiments of the present invention will be described while referring to FIGS. 2 through 11 of the accompanying drawings. The first embodiment, which is illustrated in FIGS. 2 through 4, has an oil tank 2 which holds cooled oil 18 for the main spindle system of an unillustrated machine tool. The heat pipe 13 is secured to the top of the oil tank 2 by an installation frame 14. One end of the heat pipe 13 (a heat absorbing portion 13a) is immersed in the oil tank 2 and another end (a heat dissipating portion 13b) is disposed above the oil tank 2. Both the heat absorbing portion 13a and the heat dissipating portion 13b comprise a plurality of vertically-extending sealed tubes to which fins 13c are secured in order to promote the absorption and dissipation of heat. The tubes are filled with a working fluid such as from or ammonia which will vaporize and condense within the tubes at a temperature between room temperature and the temperature of hot oil which is discharged from the machine tool. A cooling fan 15 which serves as a means for dissipating heat is secured to the front of the heat dissipating portion 13a of the heat pipe 13. The bottom of the heat absorbing portion 13b is surrounded by a box-shaped oil guide 16 which fits tightly therearound. Of the six sides of the oil-guide 16, the top and the left end are open, while plates form the other four sides. The right end of oil guide 16 in FIG. 2 serves as an intake end 16a while the left end of oil guide 16 serves as a discharge end 16b and opens onto the inside of the oil guide 16. The upper ends of the sides of the oil guide 16 are in intimate contact with the outer edges of the fins 13c so that oil can not leak therebetween into the oil tank 2. An oil intake pipe 17 which is connected to the main spindle system of an unillustrated machine tool opens onto the end wall of the oil guide 16 at the intake end 16a thereof. As shown in FIG. 4, the heat exchanger further comprises an oil return system 19 comprising a suction filter 19a which is submerged in the oil within the oil tank 2, piping 19b which connects the suction filter 19a with the unillustrated machine tool, and a pump 19c which is connected to the piping 19b so as to be able to draw oil from the oil tank 2 through the piping 19b and pump it to the machine tool.

The operation of this embodiment of a heat exchanger is as follows. Hot oil 1 from the main spindle system of a machine tool is introduced into the oil guide 16 through the oil intake pipe 17. As the hot oil 1 passes from the intake end 16a to the discharge end 16b of the oil guide 16, it flows through the spaces between the tubes of the heat absorbing portion 13a. The working fluid which is sealed in the tubes is evaporated by the hot oil 1, and by evaporating, it absorbs heat from and cools the hot oil 1. The vaporized working fluid then rises to the heat dissipating portion 13b where it is cooled by the cooling fan 15, which blows the surrounding air over the tubes of the heat dissipating portion 13b. The working fluid then condenses inside the heat dissipating portion 13b, giving up the latent heat of condensation to the surrounding air, and the condensed working fluid then flows back to the heat absorbing portion 13a.

The hot oil 1 which was cooled by the evaporation of the working fluid becomes cooled oil 18 which is at the temperature of the surrounding air. This cooled oil 18 flows out of the discharge end 16b of the oil guide 16 into the oil tank 2. The cooled oil 18 is then drawn by the pump 19c through the suction filter 19a and is returned to the machine tool through the piping 19b.

Figure 1:
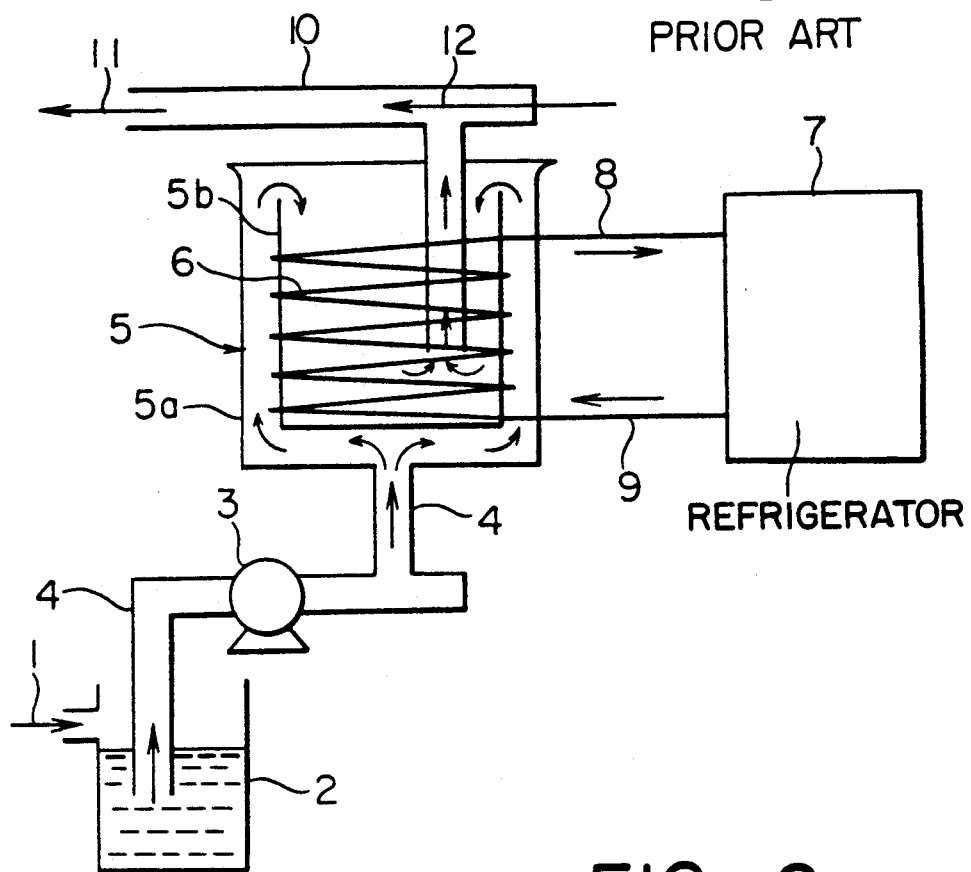
FIG. 1 is a schematic diagram of a conventional heat exchanger for oil from a machine tool.

Thus, in contrast to the conventional heat exchanger of FIG. 1 in which cooling is performed periodically, in the present invention, hot oil 1 is continuously cooled by the heat pipe 13. As the heat pipe 13 functions based on the difference between the temperature of the heat absorbing portion 13a (which is at the temperature of the hot oil 1) and the temperature of the heat dissipating portion 13b (which is at the temperature of the surrounding air), there is an exchange of heat between the hot oil 1 and the surrounding air only when the temperature of the hot oil 1 is above that of the surrounding air. The temperature of the cooled oil 18 is therefore made to approach that of the surrounding air but can nver fall below that temperature, so there is no possibility of the cooled oil 18 being overcooled. In this manner, the temperature of the cooled oil 18 is naturally controlled so as to be constant without the need for a complicated control mechanism, and there is no fluctuation in the oil temperature which accompanies the switching on and off of a refrigerator 7 in a conventional heat exchanger. Accordingly, there is no danger of fluctuations in the machining accuracy of the machine tool due to fluctuations in oil temperature, and a high machining accuracy can be maintained.

Figure 5:
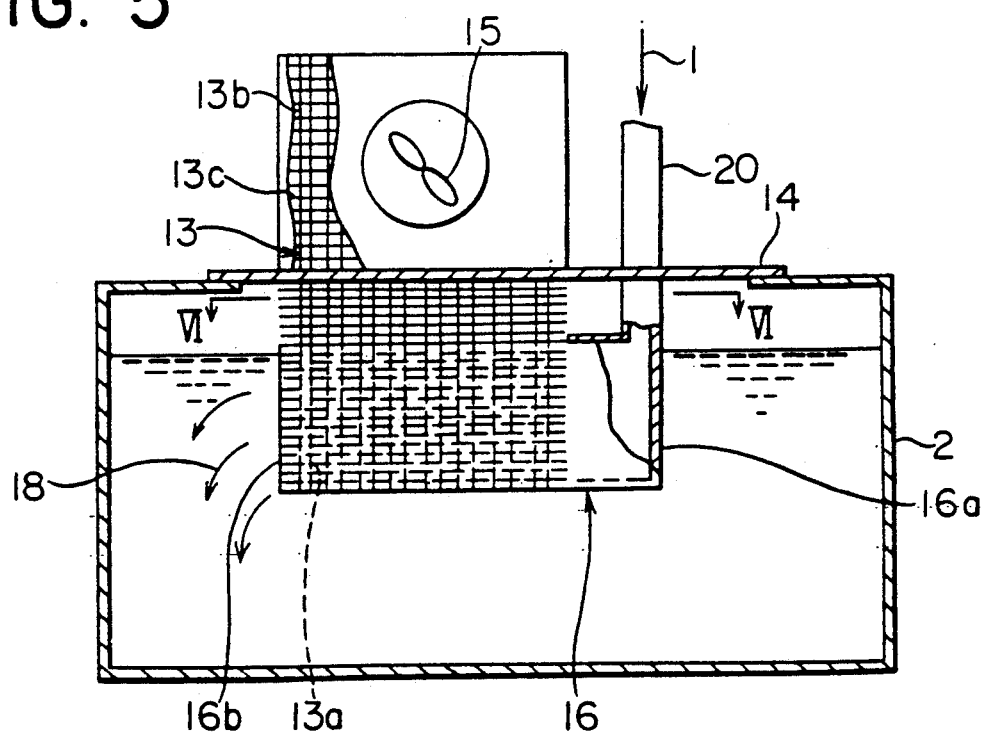
FIG. 5 is a longitudinal cross-sectional view of another embodiment of the present invention.
Figure 6:
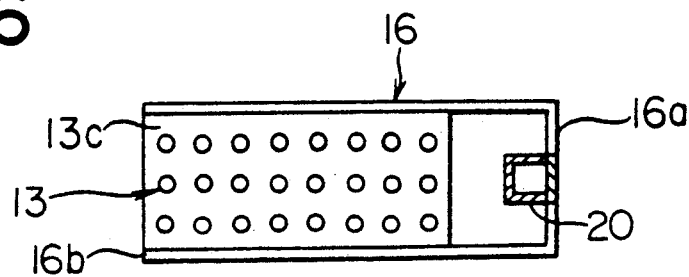
FIG. 6 is a cross-sectional view taken along Line VI—VI of FIG. 5.

In the above-described embodiment, the oil intake pipe 17 opens onto the side wall of the intake end 16a of the oil guide 16. FIGS. 5 and 6 illustrate a second embodiment of the present invention in which an oil intake pipe 20 opens onto the top intake end 16a of the oil guide 16. The structure of this embodiment is otherwise identical to that of the previous embodiment, and it provides the same benefits. By having the oil intake pipe 20 enter the top rather than the side wall of the oil guide 16, it is easier to integrate the oil intake pipe 20 and the oil guide 16 into a single member using plates-like, blocks, or the like, thus enabling a reduction in manufacturing costs.

Figure 7:
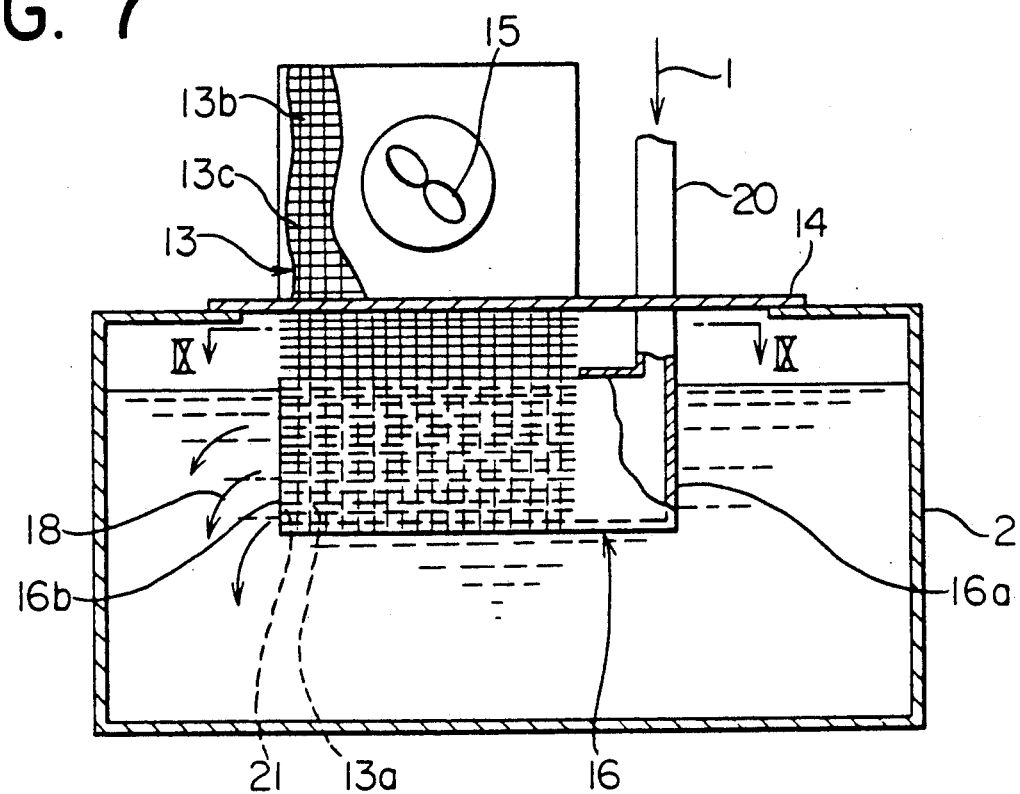
FIG. 7 is a longitudinal cross-sectional view of another embodiment of the present invention.
Figure 8:
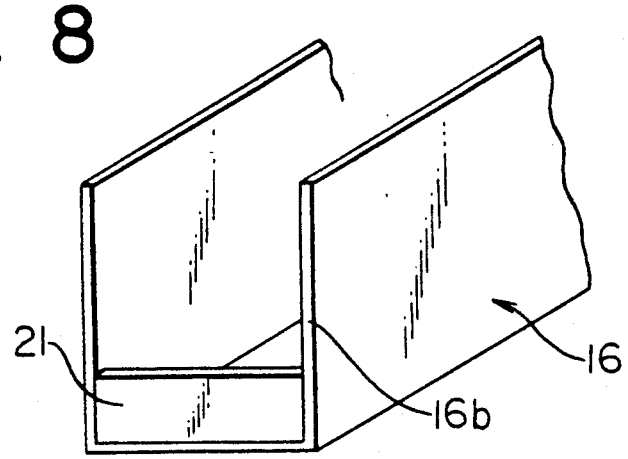
FIG. 8 is a perspective view of the left end of the oil guide of the embodiment of FIG. 7.
Figure 9:
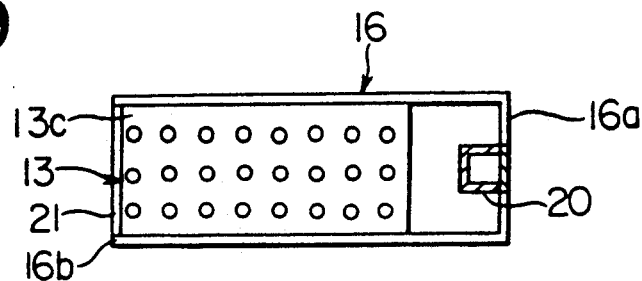
FIG. 9 is a cross-sectional view taken along Line IX—IX of FIG. 7.

When the level of oil is near the top of the oil tank 2, oil can be adequately cooled by the heat pipe 13, but when the oil level is below the bottom of the heat pipe 13, hot oil 1 which is introduced into the oil guide 16 tends to quickly flow out the discharge end 16b of the oil guide 16 without filling oil in the heat absorbing portion 13a of the heat pipe 13, and the oil is not cooled sufficiently. Therefore, in a third embodiment of the present invention, which is illustrated in FIGS. 7 through 9, an oil weir 21 is provided at the discharge end 16b of the oil guide 16 to ensure that there will always be oil within the oil guide 16. As shown in FIG. 8, the oil weir 21 comprises a plate which extends across the width and partway up the height of the discharge end 16b of the oil guide 16. Oil must flow over the top of the oil weir 21 in order to leave the oil guide 16. As a result, the level of the oil in the oil guide 16 always extends at least to the top of the oil weir 21, and even when the oil level in the oil tank 2 is below the bottom of the heat pipe 13, hot oil 1 which enters the oil guide 16 is adequately cooled before it flows into the oil tank 2. This embodiment is otherwise identical to the embodiment of FIG. 5 and functions in the same manner. An oil weir 21 can also be applied to the embodiment of FIG. 2 with the same effects.

Figure 10:
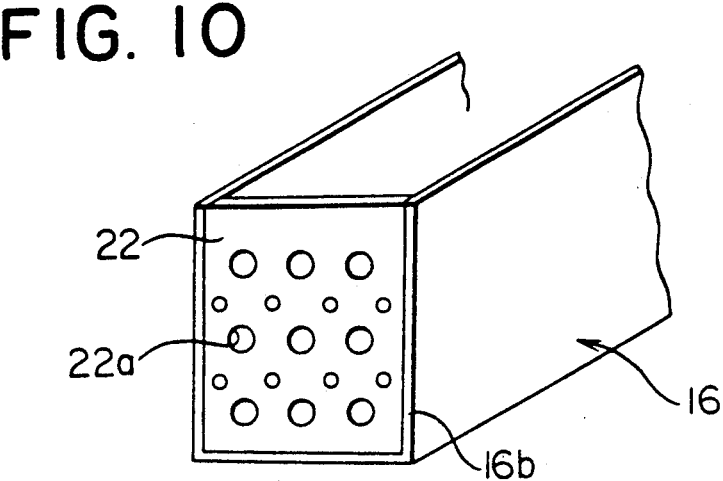
FIG. 10 is a perspective view of an oil weir of another embodiment of the present invention.

FIG. 10 illustrates the discharge end 16b of the oil guide 16 of another embodiment of the present invention. This embodiment is equipped with an oil weir 22 which extends all the way up the height of the discharge end 16b of the oil guide 16. The oil weir 22 has a plurality of through holes 22a formed in it. The structure of this embodiment is otherwise identical to that of the embodiments of FIGS. 2 or 5. Like the oil weir 21 of FIG. 8, this oil weir 22 maintains the level of oil in the oil guide 16 and ensures adequate cooling of the oil.

Figure 11:
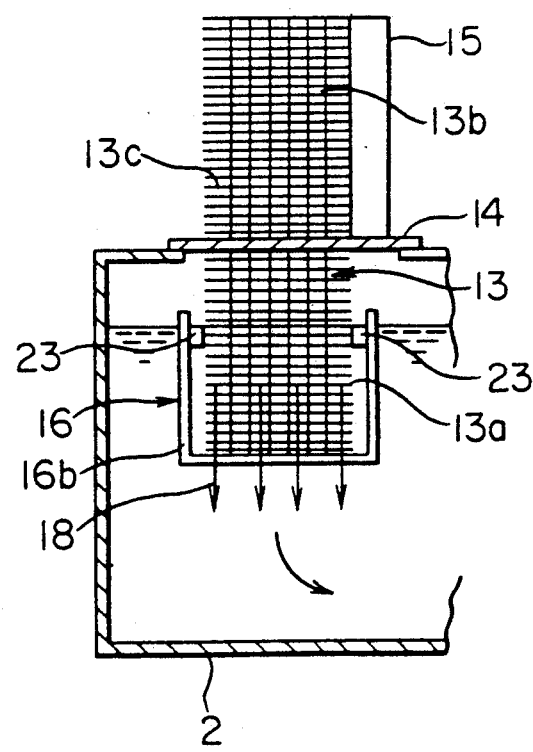
FIG. 11 is a transverse cross-sectional view of yet another embodiment of the present invention.

Ideally, all of the hot oil 1 which is introduced into the intake end 16a of the oil guide 16 exits from the discharge end 16b thereof, but because of imperfect matching of the dimensions of the oil guide 16 with the dimensions of the heat pipe 13, gaps may exist between the upper ends of the walls of the oil guide 16 and the fins 13c of the heat pipe 13. If such gaps exist, hot oil 1 may leak from the inside of the oil guide 16 over the top edge thereof into the oil tank 2, in which case the hot oil 1 can not be adequately cooled. In another embodiment of the present invention, which is illustrated in FIG. 11, this problem is solved by the use of an oil-resistant sealing material 23 made of rubber or the like between the outer edges of the fins 13c of the heat pipe 13 and the upper edges of the walls of the oil guide 16. The sealing material 23 prevents hot oil 1 from leaking out past the upper edges of the oil guide 16; therefore all the hot oil 1 which enters the intake end 16a of the oil guide 16 must pass through the heat absorbing portion 13a and flow out of the discharge end 16b, which results in the hot oil 1 being adequately cooled. The structure of this embodiment is otherwise identical to that of the embodiments of FIG. 2 or FIG. 5. Although not shown in FIG. 11, this embodiment may also be equipped with an oil weir like that shown in FIG. 8 or FIG. 10.

In each of the above-described embodiments, the heat pipe 13 is disposed at the center of an oil tank 2 with the heat absorbing portion 13a thereof immersed in oil. However, as long as the discharge end 16b of the oil guide 16 opens onto the inside of the oil tank 2, there is no restriction on the position of the heat pipe 13, and it is possible to dispose both the heat pipe 13 and the oil guide 16 on the outside of the oil tank 2 adjacent thereto.

If the heat pipe 13, the installation frame 14, the cooling fan 15, the oil guide 16, and the intake pipe 17 or 20 are rigidly connected with one another so as to form a single unit, the unit can be easily transported and readily installed on site on any type of oil tank.

Although in the above-described embodiments, the heat pipe 13 is installed on the top of the oil tank 2, it may be installed to one side of the oil tank 2. Also, though not illustrated, the piping 17 or 20 may open onto the bottom intake end 16a of the oil guide 16.

The above embodiments of a heat exchanger were described with respect to their use with the main spindle system of a machine tool, but the present invention is not limited to a main spindle system or even to a machine tool and can be applied to any machine using oil which requires cooling.

What is claimed is:

1. A heat exchanger for cooling hot oil from a machine comprising:
   an oil tank providing a reservoir for cool oil;
   a heat pipe having a heat absorbing portion and a heat dissipating portion, said heat pipe containing a working fluid which vaporizes within said heat pipe at a temperature between room temperature and the temperature of said hot oil from said machine;
   means for cooling said heat dissipating portion;
   an oil guide which surrounds the lower end of said heat absorbing portion, said oil guide being immersed in cool oil and having an intake end through which hot oil can be introduced, a discharge end which opens onto the inside of said oil tank, said intake end and said discharge end being disposed on opposite sides of the lower end of said heat absorbing portion, and walls which extend between the intake end and the discharge end and which have an open portion through which the heat pipe extends and edges at the open portion that cooperate with the lower end of said heat absorbing portion to isolate the intake end of the oil guide from the reservoir of cool oil except through the discharge end so that oil which is introduced into said intake end must flow past said heat absorbing portion before exiting from said discharge end; and
   means for supplying hot oil from said machine to said intake end of said oil guide.

2. A heat exchanger as claimed in claim 1 wherein said heat absorbing portion of said heat pipe is disposed inside said oil tank and said heat dissipating portion is disposed outside said oil tank.

3. A heat exchanger as claimed in claim 1 wherein said heat absorbing portion and said heat dissipating portion comprise vertically-extending sealed tubes which contain said working fluid and cooling fins which are secured to the outer surfaces of said tubes.

4. A heat exchanger as claimed in claim 1 wherein said means for cooling said heat dissipating portion comprises a cooling fan which is disposed so as to blow air over said heat dissipating portion.

5. A heat exchanger as claimed in claim 1 further comprising oil return means for returning cooled oil from said oil tank to said machine.

6. A heat exchanger as claimed in claim 1 wherein said oil guide is a box-shaped member which surrounds the sides of the bottom portion of the heat absorbing portion of said heat pipe, the discharge end thereof being at least partially open to the inside of said oil tank.

7. A heat exchanger as claimed in claim 6 wherein the discharge end of said oil guide is completely open.

8. A heat exchanger as claimed in claim 6 further comprising an oil weir which is disposed at the discharge end of said oil guide and which extends across the width of and at least partway up the height of said discharge end.

9. A heat exchanger as claimed in claim 8 wherein said oil weir has through holes formed therein.

10. A heat exchanger as claimed in claim 6 further comprising an oil-resistant seal material which is disposed between the upper edges of said oil guide and said heat absorbing portion of said heat pipe so as to prevent hot oil from leaking between the upper edges of said oil guide and said heat absorbing portion into said oil tank.

11. A heat exchanger as claimed in claim 1 wherein said means for supplying hot oil comprises piping, one end of which opens onto the intake end of said oil guide and the other end of which is connected to said machine.

12. A heat exchanger as claimed in claim 11 wherein said piping opens onto the intake end of said oil guide from above.

13. A heat exchanger as claimed in claim 11 wherein said piping opens onto the intake end of said oil guide from the side.

14. A heat exchanger as claimed in claim 11 wherein said piping opens onto the intake end of said oil guide from below.

15. A heat exchanger as claimed in claim 1 wherein said heat pipe is installed on the top of said oil tank.

16. A heat exchanger as claimed in claim 1 wherein said heat pipe is installed on one side of said oil tank.

* * * * *